United States Patent [19]

Iacovelli

[11] Patent Number: 4,751,618

[45] Date of Patent: Jun. 14, 1988

[54] AUTOMATIC LIGHTED AUTOMOBILE VANITY MIRROR AND LIGHTING CIRCUIT THEREFORE

[75] Inventor: Marc R. Iacovelli, Miami, Fla.

[73] Assignee: Rally Accessories, Inc., Miami, Fla.

[21] Appl. No.: 14,029

[22] Filed: Feb. 12, 1987

[51] Int. Cl.⁴ .................. F21V 33/00; H01H 35/02
[52] U.S. Cl. ................... 362/74; 200/61.52; 362/135; 362/142; 362/802
[58] Field of Search ............. 362/74, 135, 142, 802; 200/61.45 R, 61.52, 61.83

[56] References Cited

U.S. PATENT DOCUMENTS 1,341,267  5/1920  East ..................... 362/802
3,211,903 10/1965  McElreath ............. 362/802

FOREIGN PATENT DOCUMENTS 485749  8/1928  Fed. Rep. of Germany ... 200/61.52

*Primary Examiner*—Douglas Hart
*Attorney, Agent, or Firm*—Gilbert L. Wells

[57] ABSTRACT

A lighted automobile vanity mirror for mounting on an automobile sun visor has a switch for operating the illumination only when the vanity mirror is in the vertical position. This switch is a ball contact switch which rolls from an inoperative horizontal position of the vanity mirror to an operative vertical position where gravity draws the ball switch into contact with the circuits.

6 Claims, 2 Drawing Sheets

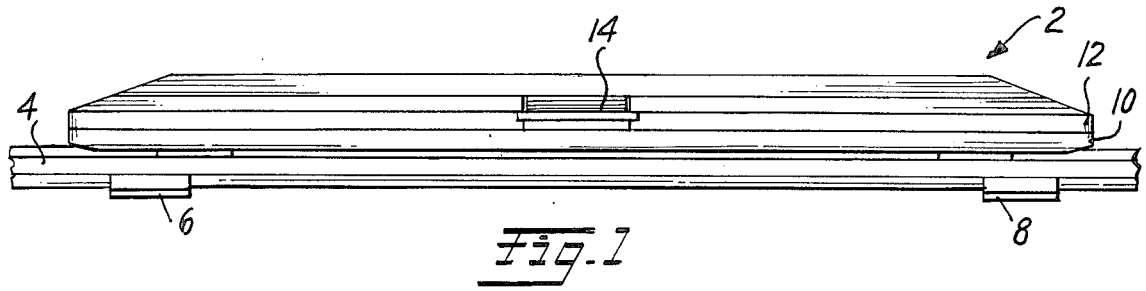
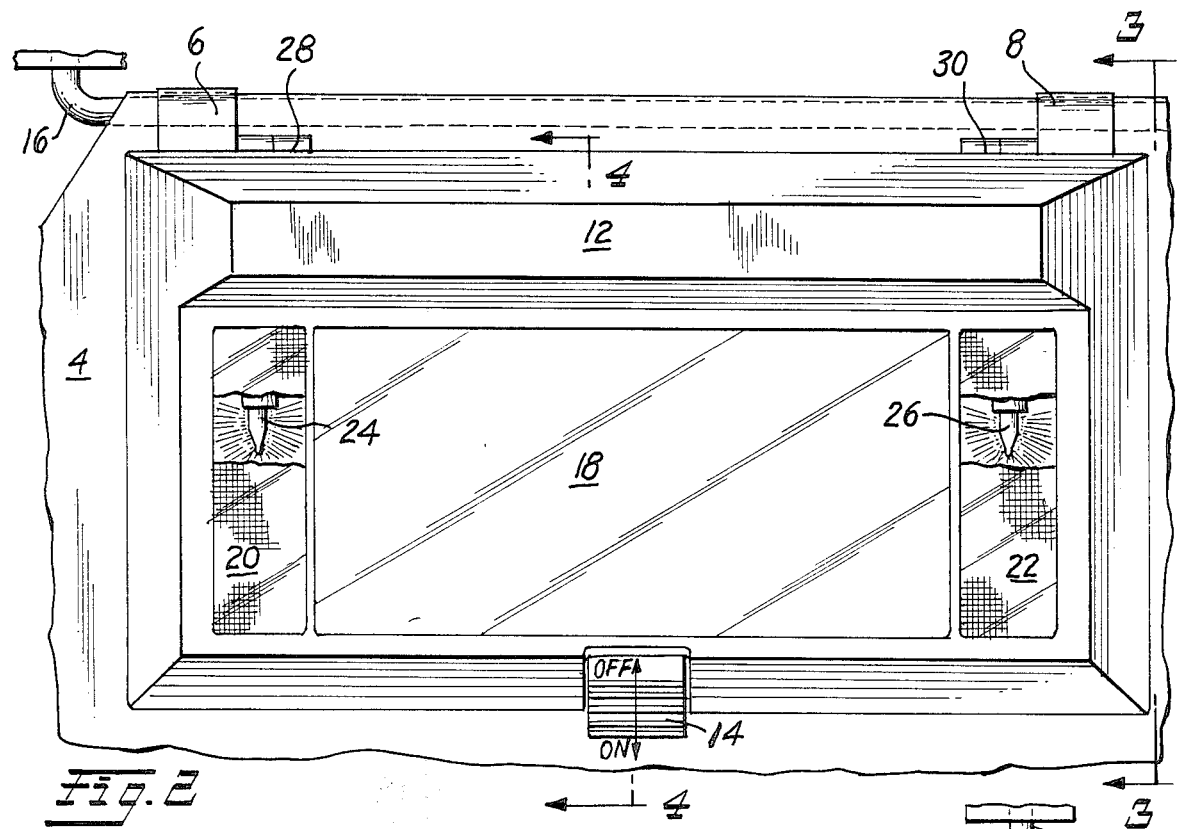
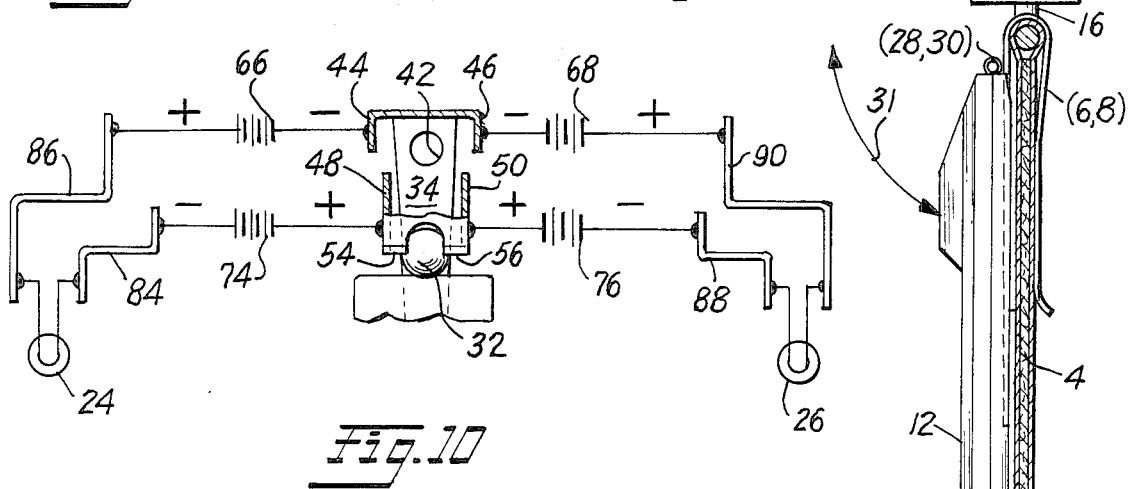
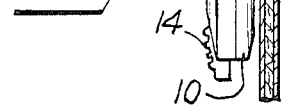

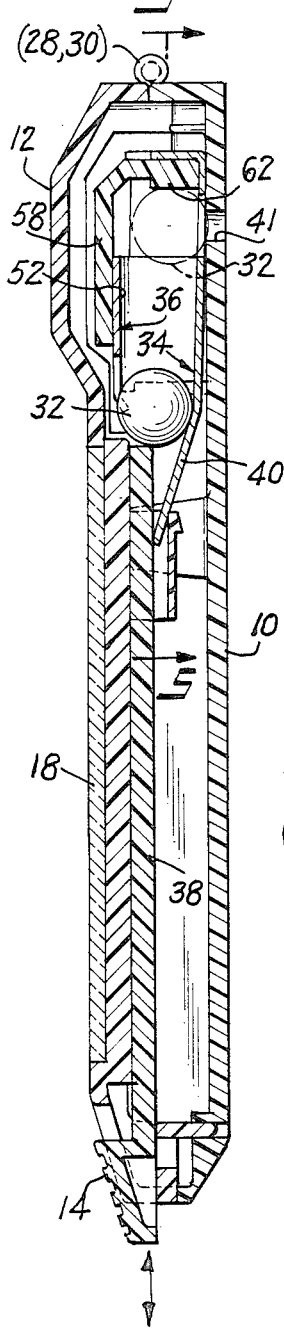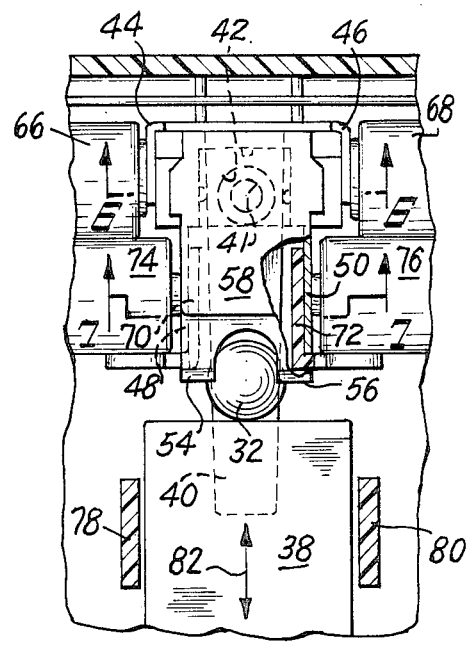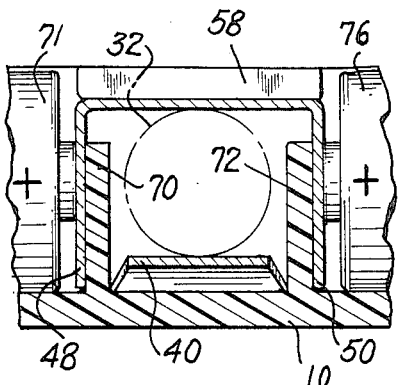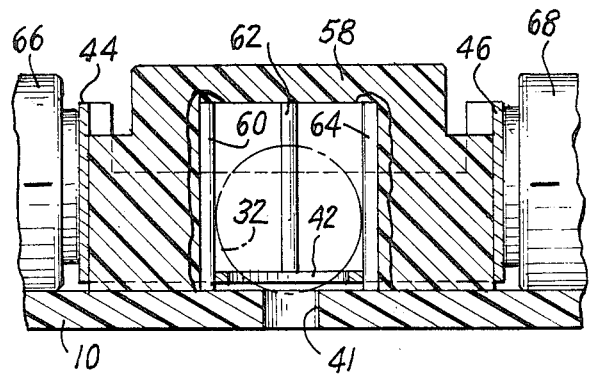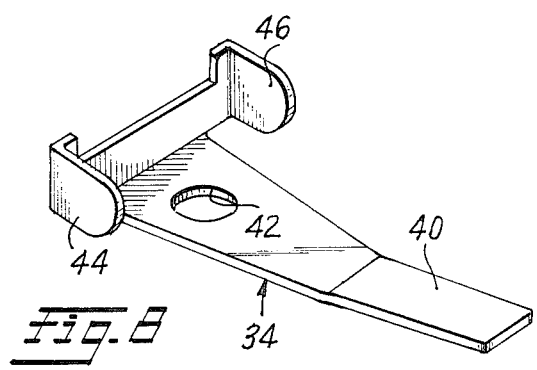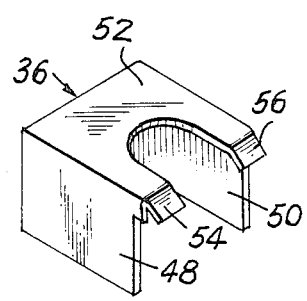

AUTOMATIC LIGHTED AUTOMOBILE VANITY MIRROR AND LIGHTING CIRCUIT THEREFORE

BACKGROUND OF THE INVENTION

The field of the invention is illumination with viewing mirror and the invention is particularly concerned with a lighted vanity mirror for the visor of an automobile which lights when tilted into the operative vertical position.

Vanity mirrors for mounting on the visors of automobiles are known and it is also known to illuminate these vanity mirrors. Dry cell batteries are used for the illumination circuits and the circuits are manually operated by off/on switches.

A problem with these prior art illuminated vanity mirrors is the failure to turn off the illumination and in a very short time the dry cell batteries expire and the bulbs no longer provide illumination.

SUMMARY OF THE INVENTION

Having in mind the limitations of the prior art, it is an object of the present invention to provide an illuminated vanity mirror which lights up only when in use.

Another object of the present invention is to provide an illuminated vanity mirror which does not light when the mirror is stored in a horizontal position.

Yet another object of the present invention is to provide an illuminated vanity mirror which does not light when the mirror is stored in an upside down position.

A principal object of the present invention is to provide an illuminated vanity mirror which lights up when in an operative, vertical, right side up position.

Still another object of the present invention is to provide an on/off switch in the illumination circuit which prevents the lighting circuits from engaging even when the vanity mirror is in the vertical position.

All of these objects are achieved by a lighting circuit having a conductive ball switch which completes the illumination circuit when the vanity mirror is moved to the vertical position and gravity pulls the ball from an inoperative to an operative position.

A manual switch presses against the ball in the off position to prevent contact. In the on position, the ball can make contact and complete the circuit only when gravity is sufficient to draw the ball into the operative position.

BRIEF DESCRIPTION ON THE DRAWINGS

The automatic lighted automobile vanity mirror and lighting circuit therefore is best described by reference to the drawings, wherein:

FIG. 1 is a front edge view of the vanity mirror of the present invention, showing the vanity case clamped to the sun visor of a vehicle;

FIG. 2 is a front view of the vanity mirror of FIG. 1;

FIG. 3 is a side view, taken on the line 3—3 of FIG. 2;

FIG. 4 is an enlarged vertical sectional view, taken on the line 4—4 of FIG. 2;

FIG. 5 is a fragmentary horizontal sectional view, taken on the staggered section line 5—5 of FIG. 4;

FIG. 6 is an enlarged fragmentary vertical sectional view, taken on the line 6—6 of FIG. 5;

FIG. 7 is a fragmentary vertical sectional view, taken on the line 7—7 of FIG. 5;

FIG. 8 is an isometric view of the switch ball ramp;

FIG. 9 is an isometric view of the ball switch bridging element; and

FIG. 10 is a schematic circuit diagram for the vanity mirror.

DESCRIPTION OF THE PREFERRED EMBODIMENTS

With particular reference to FIG. 1, the vanity case 2 is shown attached to an automobile sun visor 4 in the horizontal position by clamps 6 and 8.

The vanity case 2 has a lower base portion 10 and an upper mirror portion 12. Located on the upper mirror portion 12 is an on/off switch 14.

As seen in FIG. 2, the sun visor 4 has a support arm 16 about which the sun visor and vanity case rotate from a horizontal stowed position to a vertical position.

FIG. 2 also shows the mirror 18 and the lenses 20 and 22 and in the partial cut-away portions of the lenses, the bulbs 24 and 26 are exposed.

Hinges 28 and 30 are shown at the top of FIG. 2 about which base 10 and mirror portion 12 rotate.

FIG. 3 shows the vanity case and sun visor in the vertical position with an arrow 31 indicating the direction of rotation of the mirror portion 12 away from the base portion 10.

From the cross-sectional view of FIG. 4, the operation of the ball switch can be seen and described. Conductive ball 32 is shown in its operative position where it has been drawn by gravity when the vanity case is in the vertical position. In this operative position, the conductive ball makes contact with switch ball ramp 34 and ball switch bridging element 36. Phantom ball 32a shows the conductive ball when it is in the inoperative or horizontal position and over hole 41.

Switch 14 is shown in FIG. 4 in the ON position with slider 38 in its most extended or open position abutting ball 32. When manual switch 14 is moved vertically to the OFF position, slider 38 presses against ball 32 and moves it away from the lower end of ball switch bridging element 36 and electrical contact is thereby broken.

All of the elements 32, 34 and 36 are composed of conductive materials such as copper or copper containing metal. Base 10 and upper mirror portion 12 of the vanity case are composed of non-conductive material such as plastic. Suitable plastics are injection molded nylon, polystyrene and polyvinylchloride.

As shown in FIGS. 8 and 9, the switch ball ramp 34 has spring tongue 40, ball retainer hole 42, which is slightly larger than hole 41, and negative dry cell battery contacts 44 and 46. Ball switch bridging element 36 has vertical sides 48 and 50 functioning as positive dry cell battery contacts, top surface 52 and ball contact tabs 54 and 56.

FIGS. 5, 6 and 7 show how the circuits for light bulbs 24 and 26 are completed. Non-conductive ball ramp housing 58 is shown in FIG. 6 having negative contacts 44 and 46 on the outer sides thereof. Vertical cerrations 60, 62 and 64 function as ball retainers along with retainer holes 41 and 42 when the ball is in the inactive position. The negative contact ends of dry cells 66 and 68 make pressure contact with contacts 44 and 46 respectively.

FIG. 7 shows vertical, non-conductive ramp sides 70 and 72 extending from base 10. Conductive vertical sides 48 and 50 are positioned on the outer surfaces of ramp sides 70 and 72. The positive contact ends of dry cells 74 and 76 make pressure contact with conductive sides 48 and 50 respectively.

Slider 38 is shown in FIG. 5 with guides 78 and 80 on either side thereof. Ball 32 is shown in FIG. 5 in the operative position contacting tongue 40 and contact tabs 54 and 56. When the slider is moved upward as indicated by arrow 82, the ball is forced away from contact with tabs 54 and 56 and the circuits are broken.

FIG. 10 shows the two circuits for bulbs 24 and 26, both of which are completed by ball 32. The left hand circuit comprises in ball ramp 34, ball 32, contact tab 54, positive contact 48, battery 74, negative electrode 84, bulb 24, positive electrode 86, battery 66 and negative contact 44. The right hand circuit comprises in ball ramp 34, ball 32, contact tab 56, positive contact 50, positive battery 76, negative electrode 88, bulb 26, positive electrode 90, battery 68 and negative contact 46.

The components 32, 34 and 36 are common to both the left and right hand circuits and if one circuit is inoperative because of a dead bulb or battery, the other circuit will function.

BEST MODE OF CARRYING OUT THE INVENTION

Batteries 66, 68, 74 and 76 are mounted in vanity 2 according to the circuit diagram of FIG. 10. This is accomplished by opening the vanity as indicated in FIG. 3 by rotation about hinges 28,30 in the upward direction of arrow 31, inserting the dry cell batteries and closing the vanity.

Switch 14 is in the upward OFF position. The vanity case is rotated into the vertical or near vertical position. With switch 14 in the off position, slider 38 abuts ball 32 and no circuits are complete because ball 32 does not come into contact with any of the conductive portions of ball switch bridging element 36.

When switch 14 is moved to the downward ON position as shown in FIG. 4, the slider 38 permits gravity to draw ball 32 into contact with tabs 54 and 56 and the circuits are completed. These completed circuits pass through elements 34 to 32 to 36.

Even with switch 14 in the ON position when the sun visor and vanity case are moved into the horizontal or upside down position, the ball 32 is drawn by gravity into position 32a (FIG. 4) and electrical contact is broken.

I claim:

1. A lighted automobile vanity mirror adapted for mounting on an automobile sun visor comprising:
   (a) a non-conductive base portion;
   (b) a conductive switch ball ramp mounted on said base portion comprising first and second negative battery contacts, a ball retainer hole and a spring tongue;
   (c) a conductive ball switch bridging element mounted on said base portion in proximity to, but without contacting, said switch ball ramp;
   (d) a condcutive ball switch contained between said switch ball ramp and said ball switch bridging element having gravity actuated first and second positions wherein in said first position there is no electrical contact between said switch ball ramp and said ball switch bridging element by said ball switch and in said second position there is electrical contact;
   (e) a power source and means for illumination connected in series to said switch ball ramp and said ball switch bridging element; and
   (f) an upper mirror portion connectable to said base portion having a mirror and lens means for said means for illumination.

2. The lighted automobile vanity mirror of claim 1, wherein said means for illumination comprise two electrical bulbs, said power source comprises four dry cell batteries and lens means comprise first and second lenses positioned on either side of said mirror.

3. The lighted automobile vanity mirror of claim 2, wherein said ball switch bridging element has first and second vertical sides functioning as positive dry cell battery contacts, a top surface therebetween and first and second ball contact tabs extending from said top surface.

4. The lighted automobile vanity mirror of claim 3, further comprising an OFF/ON switch comprising a slider mounted on the inside of said upper mirror portion abutting said ball switch for movement of said ball switch away from said tabs in an OFF position.

5. A circuit for a lighted automobile vanity mirror adapted for mounting on an automobile sun visor comprising:
   (a) a conductive switch ball ramp comprising first and second negative battery contacts, a ball retainer hole and spring tongue;
   (b) a conductive ball switch bridging element in proximity to, but without contacting, said switch ball ramp;
   (c) a conductive ball switch contained between said switch ball ramp and said ball switch bridging element having gravity actuated first and second positions wherein in said first position, there is no electrical contact between said switch ball ramp and said ball switch bridging element by said ball switch and in said second position there is electrical contact; and
   (d) a power source and means for illumination connected in series to said switch ball ramp and said ball switch bridging element.

6. The circuit of claim 5, wherein said ball switch bridging element has first and second vertical sides functioning as positive dry cell battery contacts, a top surface therebetween and first and second ball contact tabs extending from said top surface.

* * * * *